Feb. 15, 1949.                I. KALIKOW                2,461,985
                         DYNAMOELECTRIC MACHINE
                          Filed Oct. 2, 1947
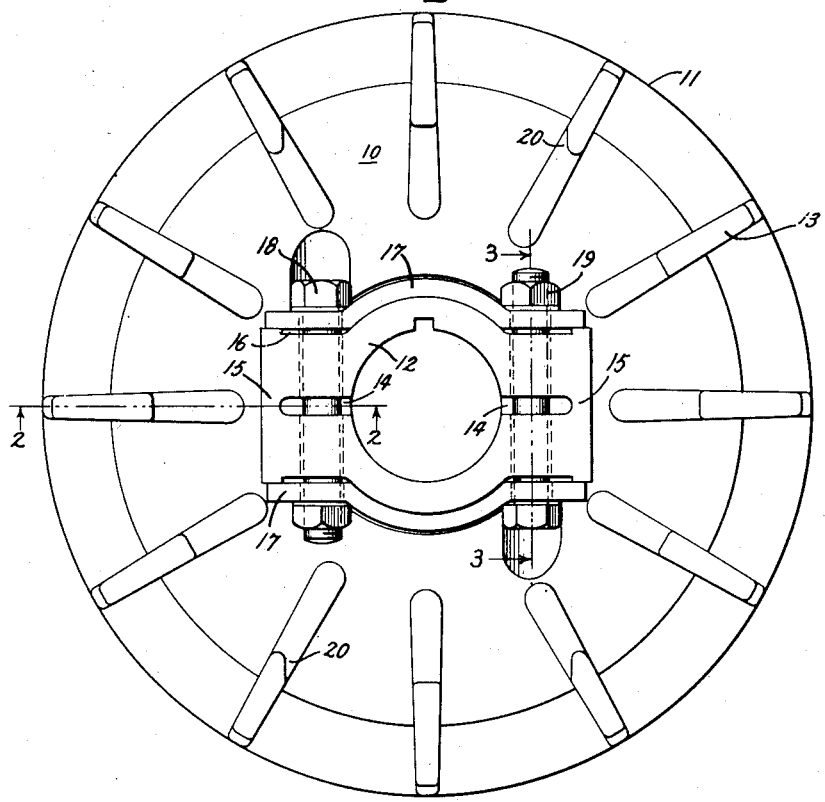
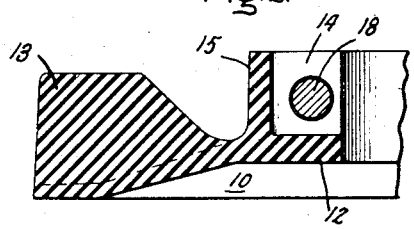
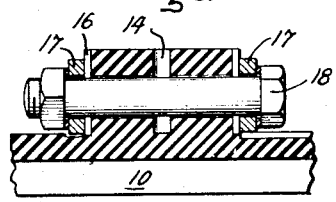
Inventor:
Irving Kalikow,
by Prowell S. Muk
His Attorney.

Patented Feb. 15, 1949

2,461,985

UNITED STATES PATENT OFFICE 2,461,985

DYNAMOELECTRIC MACHINE

Irving Kalikow, Swampscott, Mass., assignor to General Electric Company, a corporation of New York Application October 2, 1947, Serial No. 777,413

6 Claims. (Cl. 171—252)

My invention relates to dynamoelectric machines and more particularly to impellers rotatable with the shafts of said machines and intended to forcibly circulate ventilating medium therethrough.

Conventionally, impellers used for self-cooling dynamoelectric machines have been made of aluminum or other metals which are susceptible to destruction by corrosion in many applications, as when the machine is applied in a chemical plant or in an oil refinery where caustics are used in the manufacturing processes.

Further, there has been the problem of preventing sparks when a rotating metallic impeller happens to strike a metallic object, such as the cast iron of the machine frame.

It is an object of my invention to provide simple and inexpensive means for overcoming the above-mentioned difficulties.

It is a further object of my invention to provide a dynamoelectric machine impeller of organic plastic material so that the impeller will be impervious to solvents, acids and caustics, and, at the same time, to provide an impeller of a mechanical design which makes allowance for the inherent mechanical weakness of materials commonly known as "plastics."

Further objects and advantages will become apparent and my invention will be better understood by consideration of the following description taken in connection with the accompanying drawing in which Fig. 1 represents a plan view of a dynamoelectric machine impeller suitably embodying my invention, Fig. 2 is a sectional view along the line 2—2 of Fig. 1, and Fig. 3 is a sectional view along the line 3—3 of Fig. 1.

Broadly the means employed in the embodiment herein illustrated and described comprises an impeller of a thermosetting resin or other organic plastic material, the impeller comprising a plastic hub provided with relief grooves and pressure supporting columns, and two bolted metallic pressure straps which apply force radially inward on the hub to firmly secure the same to the shaft of the machine without danger of breaking the plastic at the time of said fastening.

In Fig. 1, I have shown a plan view of an impeller 10 adapted to rotate with the shaft of a dynamoelectric machine (not shown) for forcing ventilating medium therethrough. The impeller may be made by molding a high strength organic plastic material to the desired shape. Examples of suitable organic plastics are, for example, those of the phenol-aldehyde, urea-aldehyde, and melamine-aldehyde types. In order to obtain sufficient strength in the material it is preferable to employ long fiber fillers such as, for example, chopped rags.

The impeller comprises a main annular ring portion 11 and molded integral therewith a hub portion 12. Attached to the outer ring portion 11, as by molding integral therewith, are individual impeller blades 13. The hub 12 is provided with two kerfs or notches 14 which extend from the inner bore of the hub radially outward to points less distant than the outer limit of the hub in order to form two pressure supporting columns designated as 15 in the drawing. Between these columns 15 and the outer round of the hub, relief grooves 16 are provided in the plastic surface. Two metal pressure straps 17 are used to provide pressure to the plastic hub through the bolting action of two oppositely disposed bolts 18 and nuts 19. Four of the impeller blades 13 are cut away as at 20 to provide access to the nuts and the bolts. The kerfs 14 extend an axial distance through the hub less than the total hub thickness as more clearly shown in Figs. 2 and 3.

In Fig. 2 I have shown a cross section taken along the line 2—2 of Fig. 1 and showing the plastic impeller 10 comprising blade 13 and pressure supporting column portion 15 of the hub 12. Fig. 2 also shows a cross section of bolt 18 as it passes through kerf 14. The kerf 14 extends less than the total hub thickness to provide a solid section of hub extending from the main body of the fan to the dynamoelectric machine shaft (not shown) to prevent water or other liquids from passing into the motor along the shaft. This solid section does not prevent clamping action from taking place as the plastic material deforms sufficiently under the straps to hold firmly on the shaft.

In Fig. 3 I have shown a cross section taken along the line 3—3 of Fig. 1 and showing kerf 14, one of the two bolts 18, relief groove 16, and the two metal pressure straps 17.

It is seen from Fig. 3 that the straps 17 are displaced (in my actual construction about ⅛") from the radially extending face of the hub.

With my improved impeller assembly described above, if the fan happens to loosen on the shaft, or the shaft moves axially, no sparks will result as only the plastic will come in contact with the frame or other stationary metal. This is of advantage in meeting underwriters' requirements of non-sparking in so-called "hazardous" locations. In addition, the fact that the kerfs 14 are not axially continuous but terminate to form a liquid barrier around the shaft, as previously described, is of importance for applications, such as in car washing equipment, where a liquid is apt to be forcibly introduced against the fan and must not be allowed to reach the dynamoelectric machine windings. In addition with my improved design described above, a plastic material may be chosen which is relatively inert to chemicals. With the construction shown the plastic material is mainly in compression, very little shearing forces are produced and the plastic will not fail due to shearing forces even though large forces are applied by tightening the bolts to fasten the impeller to the shaft. This is insured by the relief grooves which causes the bolt fastening pressure to be transmitted directly to the shaft by permitting deflection of the metallic pressure straps directly under the bolt head and nut. With the construction shown the bolts may be tightened up as much as desired without the plastic cracking, which is a great advantage in equipment likely to be serviced by all kinds of personnel. In addition the molded impeller described can usually be produced at lower cost than a metallic fan.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. In a dynamoelectric machine having a rotatable shaft, a plastic impeller rotatable with said shaft, said impeller comprising impeller blades and a hub, said hub provided with metallic pressure straps, means including bolts for transmitting pressure through said straps to fasten said hub to said shaft, relief grooves in the surfaces of said plastic hub each of said grooves being adjacent one of said straps and adjacent one of said bolts, and pressure supporting columns in said hub adjacent said grooves each of said columns extending between the inner surfaces of said pressure straps, whereby said hub may be tightened onto said shaft without imposing shearing forces on said plastic.

2. In a dynamoelectric machine having a rotatable shaft, a thermosetting organic plastic impeller rotatable with said shaft and comprising integrally molded impeller blades and a hub portion, said hub portion provided with metallic pressure straps, means including bolts for transmitting pressure through said straps to said hub portion, means including relief grooves in the surface of said hub portion adjacent each of said straps and surrounding each of said bolts and pressure supporting columns in said hub portion between said straps whereby said hub may be tightened onto said shaft.

3. A dynamoelectric machine impeller comprising hub and blade members, said hub having an inner bore and a keyway for attachment to a rotatable member of said machine, said hub having diametrically opposite slots extending radially outward from said bore through a portion of said hub and terminating to form two supporting columns, at least two metallic pressure straps adapted to be placed around opposite faces of said hub, means for securing said straps to said hub and for exerting pressure through said hub to fasten said hub to said rotatable member, and means including relief grooves in the surfaces of said hub adjacent said securing means for allowing said pressure straps to yield when said securing means is tightened.

4. In a dynamoelectric machine a thermosetting organic plastic impeller comprising a hub and blade members, said hub having an inner bore to adapt it for attachment to a rotating part of said machine, said hub having diametrically opposite outer arcuate faces and intervening substantially flat faces, means including metallic clamps for clamping said arcuate faces, means including bolts for applying pressure to said clamps, relief grooves provided in said flat faces adjacent said means for applying pressure to said clamps, and kerfs extending radially outward from said inner bore at diametrically opposite points adjacent said clamping means, said kerfs extending axially along said bore a distance less than the thickness of said hub to provide a solid liquid seal portion of said hub.

5. In a dynamoelectric machine an impeller comprising a hub and blade members of insulating material, said hub having an inner bore to adapt it for attachment to a rotating part of said machine, said hub having diametrically opposite outer arcuate faces and intervening substantially flat faces, means including metallic clamps for clamping said arcuate faces, means including bolts for applying pressure to said clamps, relief grooves provided in flat faces of said hub adjacent said means for applying pressure to said clamps, and slots extending radially outward from said inner bore at diametrically opposite points adjacent said clamping means, said clamping means located axially inward from the outer radially extending face of said hub to prevent metal striking metal during operation of said impeller in said dynamoelectric machine, whereby sparks may be prevented.

6. A dynamoelectric machine having a shaft, a ventilating medium impeller rotatable with said shaft, said impeller comprising blades and a hub portion integrally molded of a thermosetting organic plastic material, said hub portion having an inner bore and a pair of diametrically opposite arcuate outer faces, said hub having a pair of diametrically opposite slots radially extending a distance less than the adjacent outer faces of said hub to form a pair of pressure supporting columns along said faces, a pair of metallic strap members arcuately shaped to adapt said members to engage said arcuate outer faces of said hub, said strap members terminating in flat ends adapted to be placed parallel to said radially extending slots, relief grooves in the outer faces of said hub between said pressure supporting columns and said arcuate outer faces, means including bolts for fastening said strap members to said hub, said fastening means passing through said relief grooves and through said radial slots adjacent said pressure supporting columns, whereby said hub may be attached to said shaft with said fastening means applying through said straps only compressive forces to said hub portion.

IRVING KALIKOW.

REFERENCES CITED

The following references are of record in the file of this patent:

UNITED STATES PATENTS

| Number | Name | Date |
|---|---|---|
| 460,233 | Kennedy | Sept. 29, 1891 |
| 1,812,060 | Rayfield | June 30, 1931 |
| 1,817,556 | Hamilton | Aug. 4, 1931 |